United States Patent
Sanchez et al.

(10) Patent No.: US 10,896,403 B2
(45) Date of Patent: Jan. 19, 2021

(54) SYSTEMS AND METHODS FOR MANAGING DATED PRODUCTS

(71) Applicant: Vocollect, Inc., Pittsburgh, PA (US)

(72) Inventors: Vanessa Cassandra Sanchez, Pittsburgh, PA (US); John Pecorari, Harrison City, PA (US); George Joshue Karabin, Pittsburgh, PA (US); Justin Volz, Verona, PA (US); Brian Bender, Jeannette, PA (US); Mark Mellott, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 1025 days.

(21) Appl. No.: 15/212,321

(22) Filed: Jul. 18, 2016

(65) Prior Publication Data

US 2018/0018623 A1 Jan. 18, 2018

(51) Int. Cl.
*G06Q 10/08* (2012.01)
*G06F 3/16* (2006.01)
(Continued)

(52) U.S. Cl.
CPC ......... *G06Q 10/087* (2013.01); *G06F 3/167* (2013.01); *G06Q 10/10* (2013.01); *G10L 15/26* (2013.01); *H04R 1/10* (2013.01)

(58) Field of Classification Search
CPC ........ G06Q 10/08; G06Q 20/00; G06Q 10/00; G06K 7/10; G06F 7/00
(Continued)

(56) References Cited

U.S. PATENT DOCUMENTS 6,021,392 A * 2/2000 Lester .................. G06F 19/326
705/2
6,832,725 B2 12/2004 Gardiner et al.
(Continued)

FOREIGN PATENT DOCUMENTS

CN 103745342 A 4/2014
EP 3043300 A1 7/2016
(Continued)

OTHER PUBLICATIONS

Office Action in related European Application No. 17181028.6 dated Sep. 18, 2018, pp. 1-7 [All references previously cited.].
(Continued)

*Primary Examiner* — Olusegun Goyea
(74) *Attorney, Agent, or Firm* — Alston & Bird LLP

(57) ABSTRACT

A mobile device can receive information from a computer; at least partially in response to the receiving of the information from the computer, the mobile device can communicate with a worker regarding a product type; the mobile device can receive information from the worker via voice, wherein the information received from the worker can identify a date or other product information associated with a product of the product type; and the mobile device can provide the product information to the computer. The mobile device can provide a second voice prompt to the worker, wherein the second voice prompt can request a quantity of products of the product type that are marked with the product information; then the mobile device can receive a quantity from the worker via voice; and the mobile device can report to the computer.

12 Claims, 6 Drawing Sheets

(51) Int. Cl.
*G06Q 10/10* (2012.01)
*G10L 15/26* (2006.01)
*H04R 1/10* (2006.01)

(58) Field of Classification Search
USPC ............. 1/1; 340/10.4, 572.1; 235/385, 439;
705/28, 22; 700/215
See application file for complete search history.

(56) References Cited

U.S. PATENT DOCUMENTS

| | | | |
|---|---|---|---|
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,464,873 B2 | 12/2008 | Spencer et al. | |
| 7,516,120 B2 | 4/2009 | Ghazaleh | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 * | 2/2014 | Vargo | G06K 7/10297 340/10.4 |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |

(56) References Cited

U.S. PATENT DOCUMENTS

| | | | |
|---|---|---|---|
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |
| 8,933,791 B2* | 1/2015 | Vargo | G06K 7/0008 340/10.4 |
| 8,939,374 B2 | 1/2015 | Jovanovski et al. | |
| 8,942,480 B2 | 1/2015 | Ellis | |
| 8,944,313 B2 | 2/2015 | Williams et al. | |
| 8,944,327 B2 | 2/2015 | Meier et al. | |
| 8,944,332 B2 | 2/2015 | Harding et al. | |
| 8,950,678 B2 | 2/2015 | Germaine et al. | |
| D723,560 S | 3/2015 | Zhou et al. | |
| 8,967,468 B2 | 3/2015 | Gomez et al. | |
| 8,971,346 B2 | 3/2015 | Sevier | |
| 8,976,030 B2 | 3/2015 | Cunningham et al. | |
| 8,976,368 B2 | 3/2015 | Akel et al. | |
| 8,978,981 B2 | 3/2015 | Guan | |
| 8,978,983 B2 | 3/2015 | Bremer et al. | |
| 8,978,984 B2 | 3/2015 | Hennick et al. | |
| 8,985,456 B2 | 3/2015 | Zhu et al. | |
| 8,985,457 B2 | 3/2015 | Soule et al. | |
| 8,985,459 B2 | 3/2015 | Kearney et al. | |
| 8,985,461 B2 | 3/2015 | Gelay et al. | |
| 8,988,578 B2 | 3/2015 | Showering | |
| 8,988,590 B2 | 3/2015 | Gillet et al. | |
| 8,991,704 B2 | 3/2015 | Hopper et al. | |
| 8,996,194 B2 | 3/2015 | Davis et al. | |
| 8,996,384 B2 | 3/2015 | Funyak et al. | |
| 8,998,091 B2 | 4/2015 | Edmonds et al. | |
| 9,002,641 B2 | 4/2015 | Showering | |
| 9,007,368 B2 | 4/2015 | Laffargue et al. | |
| 9,010,641 B2 | 4/2015 | Qu et al. | |
| 9,015,513 B2 | 4/2015 | Murawski et al. | |
| 9,016,576 B2 | 4/2015 | Brady et al. | |
| D730,357 S | 5/2015 | Fitch et al. | |
| 9,022,288 B2 | 5/2015 | Nahill et al. | |
| 9,030,964 B2 | 5/2015 | Essinger et al. | |
| 9,033,240 B2 | 5/2015 | Smith et al. | |
| 9,033,242 B2 | 5/2015 | Gillet et al. | |
| 9,036,054 B2 | 5/2015 | Koziol et al. | |
| 9,037,344 B2 | 5/2015 | Chamberlin | |
| 9,038,911 B2 | 5/2015 | Xian et al. | |
| 9,038,915 B2 | 5/2015 | Smith | |
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,359 B2 | 6/2015 | Caballero et al. | |
| 9,047,420 B2 | 6/2015 | Caballero | |
| 9,047,525 B2 | 6/2015 | Barber | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,053,380 B2 | 6/2015 | Xian et al. | |
| 9,057,641 B2 | 6/2015 | Amundsen et al. | |
| 9,058,526 B2 | 6/2015 | Powilleit | |
| 9,064,165 B2 | 6/2015 | Havens et al. | |
| 9,064,167 B2 | 6/2015 | Xian et al. | |
| 9,064,168 B2 | 6/2015 | Todeschini et al. | |
| 9,064,254 B2 | 6/2015 | Todeschini et al. | |
| 9,066,032 B2 | 6/2015 | Wang | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 9,224,022 B2 | 12/2015 | Ackley et al. | |
| 9,224,027 B2 | 12/2015 | Van Horn et al. | |
| D747,321 S | 1/2016 | London et al. | |
| 9,230,140 B1 | 1/2016 | Ackley | |
| 9,443,123 B2 | 1/2016 | Hejl | |
| 9,250,712 B1 | 2/2016 | Todeschini | |
| 9,258,033 B2 | 2/2016 | Showering | |
| 9,262,633 B1 | 2/2016 | Todeschini et al. | |
| 9,310,609 B2 | 4/2016 | Rueblinger et al. | |
| D757,009 S | 5/2016 | Oberpriller et al. | |
| 9,342,724 B2 | 5/2016 | McCloskey | |
| 9,375,945 B1 | 6/2016 | Bowles | |
| D760,719 S | 7/2016 | Zhou et al. | |
| 9,390,596 B1 | 7/2016 | Todeschini | |
| D762,604 S | 8/2016 | Fitch et al. | |
| D762,647 S | 8/2016 | Fitch et al. | |
| 9,412,242 B2 | 8/2016 | Van Horn et al. | |
| D766,244 S | 9/2016 | Zhou et al. | |
| 9,443,222 B2 | 9/2016 | Singel et al. | |
| 9,449,205 B2* | 9/2016 | Vargo | G06K 7/10128 |
| 9,478,113 B2 | 10/2016 | Xie et al. | |
| 9,679,321 B1* | 6/2017 | Pitzel | G06Q 30/0609 |
| 10,108,824 B2* | 10/2018 | Vargo | G06K 7/0008 |
| 2004/0117243 A1 | 6/2004 | Chepil | |
| 2007/0063048 A1 | 3/2007 | Havens et al. | |
| 2008/0046114 A1* | 2/2008 | White | G06Q 10/08 700/215 |
| 2008/0097876 A1* | 4/2008 | White | G06Q 20/203 705/28 |
| 2009/0134221 A1 | 5/2009 | Zhu et al. | |
| 2009/0303001 A1* | 12/2009 | Brumer | A61B 5/04286 340/10.1 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0265880 A1 | 10/2010 | Rautiola et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0150699 A1* | 6/2012 | Trapp | G06Q 10/08 705/28 |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2013/0037613 A1 | 2/2013 | Soldate | |
| 2013/0043312 A1 | 2/2013 | Van Horn | |
| 2013/0075168 A1 | 3/2013 | Amundsen et al. | |
| 2013/0080289 A1 | 3/2013 | Roy et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270341 A1* | 10/2013 | Janneh | G06F 16/00 235/383 |
| 2013/0270346 A1 | 10/2013 | Xian et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0313325 A1 | 11/2013 | Wilz et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0025584 A1 | 1/2014 | Liu et al. | |
| 2014/0100813 A1 | 1/2014 | Showering | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |

(56) References Cited

U.S. PATENT DOCUMENTS

| | | |
|---|---|---|
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0148947 A1* | 5/2014 | Levesque ............ G07F 17/0092 700/237 |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0165614 A1* | 6/2014 | Manning ................. F25D 29/00 62/62 |
| 2014/0166754 A1* | 6/2014 | Vargo ................. G06K 7/10069 235/439 |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0102913 A1* | 4/2015 | Vargo ................. G06K 7/10039 340/10.4 |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |

(56) References Cited

U.S. PATENT DOCUMENTS

| | | | |
|---|---|---|---|
| 2015/0254485 | A1 | 9/2015 | Feng et al. |
| 2015/0327012 | A1 | 11/2015 | Bian et al. |
| 2016/0014251 | A1 | 1/2016 | Hejl |
| 2016/0040982 | A1 | 2/2016 | Li et al. |
| 2016/0042241 | A1 | 2/2016 | Todeschini |
| 2016/0057230 | A1 | 2/2016 | Todeschini et al. |
| 2016/0109219 | A1 | 4/2016 | Ackley et al. |
| 2016/0109220 | A1 | 4/2016 | Laffargue |
| 2016/0109224 | A1 | 4/2016 | Thuries et al. |
| 2016/0112631 | A1 | 4/2016 | Ackley et al. |
| 2016/0112643 | A1 | 4/2016 | Laffargue et al. |
| 2016/0124516 | A1 | 5/2016 | Schoon et al. |
| 2016/0125217 | A1 | 5/2016 | Todeschini |
| 2016/0125342 | A1 | 5/2016 | Miller et al. |
| 2016/0133253 | A1 | 5/2016 | Braho et al. |
| 2016/0171720 | A1 | 6/2016 | Todeschini |
| 2016/0178479 | A1 | 6/2016 | Goldsmith |
| 2016/0180678 | A1 | 6/2016 | Ackley et al. |
| 2016/0189087 | A1 | 6/2016 | Morton et al. |
| 2016/0189270 | A1 | 6/2016 | Mellott et al. |
| 2016/0125873 | A1 | 7/2016 | Braho et al. |
| 2016/0203429 | A1 | 7/2016 | Mellott et al. |
| 2016/0227912 | A1 | 8/2016 | Oberpriller et al. |
| 2016/0232891 | A1 | 8/2016 | Pecorari |
| 2016/0260148 | A1* | 9/2016 | High .................. G05D 1/0246 |
| 2016/0292477 | A1 | 10/2016 | Bidwell |
| 2016/0292633 | A1* | 10/2016 | Griffin ............... G06K 7/10861 |
| 2016/0294779 | A1 | 10/2016 | Yeakley et al. |
| 2016/0306769 | A1 | 10/2016 | Kohtz et al. |
| 2016/0314276 | A1 | 10/2016 | Sewell et al. |
| 2016/0314294 | A1 | 10/2016 | Kubler et al. |
| 2016/0350709 | A1* | 12/2016 | Taylor .................. G06Q 10/087 |
| 2017/0004334 | A1* | 1/2017 | Vargo ................. G06K 7/10297 |

FOREIGN PATENT DOCUMENTS

| | | | |
|---|---|---|---|
| WO | 2013163789 | A1 | 11/2013 |
| WO | 2013173985 | A1 | 11/2013 |
| WO | 2014019130 | A1 | 2/2014 |
| WO | 2014110495 | A1 | 7/2014 |

OTHER PUBLICATIONS

Extended Search Report in related European Application No. 17181028.6 dated Sep. 11, 2017, pp. 1-8.

Ackerman, "Voice Recognition Systems Technology at Work in Today's Warehouse/Distribution Facilities", Prologis Supply Chain Review, Mar. 1, 2006, Denver, CO, Retrieved from the Internet: URL:http://www.prologis.com/docs/research/supply chain/Voice_Recognition_Systems_-_March 2006.pdf, 12 pages [Cited in EP Search Report].

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User'S Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

Decision to Refuse for European Application No. 17181028.6, dated Feb. 5, 2020, 13 pages.

Summons to Attend Oral Proceedings for European Application No. 17181028.6, dated Sep. 5, 2019, 11 pages.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

* cited by examiner

SYSTEMS AND METHODS FOR MANAGING DATED PRODUCTS

FIELD OF THE INVENTION

The present invention generally relates to managing products by associated product information and, more particularly, to automated systems and methods for use in managing dated products.

BACKGROUND

It is typically desirable in retail and wholesale settings to properly manage dated products (e.g., products with freshness, expiration or sale-by dates, or the like) in order to avoid financial losses associated with unsold products being out-of-date. For example, it is typically desirable to promote the sale of products that are approaching their sale-by dates by making such products more visible or offering discounts on then. As another example, it is typically undesirable for out-of-date products to be unintentionally sold to customers. However, properly managing dated products in retail or other settings can be very time consuming.

Therefore, there is a desire for improved systems and methods for managing dated products.

SUMMARY

In one aspect, the present invention embraces a method of managing products by associated dates, the method comprising: providing information from a computer to a headset; providing, by the headset and at least partially in response to the providing of the information from the computer, a first voice prompt to a worker requesting a date associated with at least one product of a product type; receiving, by the headset, a date from the worker via voice; providing, by the headset and in response to the receiving of the date, a second voice prompt to the worker requesting a quantity of products of the product type that are marked with the date; receiving, by the headset, a quantity from the worker via voice; and providing, by the headset, information indicative of the date and the quantity to the computer.

In one embodiment, the method comprises determining, by the computer, whether the date associated with the at least one product is valid.

In one embodiment, the date is a first date, and the method comprises: providing, by the headset, a third voice prompt to the worker requesting a second date associated with at least one product of the product type; then receiving, by the headset, a second date from the worker via voice; providing, by the headset in response to the headset receiving the second date, a fourth voice prompt to the worker requesting a quantity of products of the product type that are marked with the second date; and receiving, by the headset, a quantity from the worker via voice.

In one embodiment, the product type is a first product type, and the method comprises: receiving, by the headset, an indication that there are no more products of the first product type from the worker via voice; providing, by the headset, a fifth voice prompt to the worker requesting a date associated with at least one product of a second product type; then receiving, by the headset, a third date from the worker via voice; providing, by the headset in response to the headset receiving the third date, a sixth voice prompt to the worker requesting a quantity of products of the second product type that are marked with the third date; and then receiving, by the headset, a quantity from the worker via voice.

In one aspect, the present invention embraces a method of managing products by associated dates, the method comprising: identifying, by a mobile device, a product type to a worker; receiving, by the mobile device, a date associated with at least one product of the product type from the worker via voice; and providing, by the mobile device, information indicative of the date associated with the at least one product to a computer.

In an embodiment, the mobile device comprises a headset.

In an embodiment, the method comprises identifying, by the mobile device, the product type to the worker via voice.

In an embodiment, the method comprises determining, by the computer, whether the date associated with the at least one product is valid.

In an embodiment, the method comprises requesting, by the mobile device, a quantity of products of the product type that are marked with the date associated with the at least one product.

In an embodiment, the product type is a first product type, and the method comprises: identifying, by the mobile device, the first product type to the worker via a first voice prompt; providing, by the mobile device and in response to the receiving of the date, a second voice prompt to the worker requesting a quantity of products of the first product type that are marked with the date; receiving, by the mobile device, a quantity from the worker via voice; identifying, by the mobile device, a second product type to the worker via a third voice prompt; receiving, by the mobile device, a date associated with at least one product of the second product type from the worker via voice; and requesting, by the mobile device, a quantity of products of the second product type that are marked with the date associated with the at least one product of the second product type via a third voice prompt.

In an embodiment, the date is a first date, and the method comprises: providing, by the mobile device and in response to the receiving of the date, a second voice prompt to the worker requesting a quantity of products of the first product type that are marked with the date; providing, by the mobile device, a third voice prompt to the worker requesting a second date associated with at least one product of the product type; then receiving, by the mobile device, a second date from the worker via voice; providing, by the mobile device in response to the mobile device receiving the second date, a fourth voice prompt to the worker requesting a quantity of products of the product type that are marked with the second date; and receiving, by the mobile device, a quantity from the worker via voice.

In an embodiment, the product type is a first product type, and the method comprises: the mobile device receiving from the worker via voice an indication that there are no more products of the first product type; the mobile device providing a fifth voice prompt to the worker, the fifth voice prompt requesting a date associated with at least one product of a second product type; then the mobile device receiving a third date from the worker via voice; in response to the mobile device receiving the third date, the mobile device providing a sixth voice prompt to the worker, the sixth voice prompt requesting a quantity of products of the second product type that are marked with the third date; and then the mobile device receiving a quantity from the worker via voice.

In one aspect, the present invention embraces a method of managing products by associated product information, the method comprising: identifying, by a mobile device, a product type to a worker; receiving, by the mobile device, product information associated with at least one product of the product type from the worker via voice; and providing, by the mobile device, information indicative of the product information associated with the at least one product to a computer.

In an embodiment, the mobile device comprises a headset.

In an embodiment, the method comprises identifying, by the mobile device, the product type to the worker via voice.

In an embodiment, the method comprises determining, by the computer, whether the product information is valid.

In an embodiment, the product information is a date associated with the at least one product.

In an embodiment, the date is a first date, and the method comprises: providing, by the mobile device and in response to the receiving of the date, a second voice prompt to the worker requesting a quantity of products of the first product type that are marked with the date; providing, by the mobile device, a third voice prompt to the worker requesting a second date associated with at least one product of the product type; then receiving, by the mobile device, a second date from the worker via voice; providing, by the mobile device in response to the mobile device receiving the second date, a fourth voice prompt to the worker requesting a quantity of products of the product type that are marked with the second date; and receiving, by the mobile device, a quantity from the worker via voice.

In an embodiment, the method comprises requesting, by the mobile device, a quantity of products of the product type that are marked with the product information.

In an embodiment, the product type is a first product type, and the method comprises: identifying, by the mobile device, a second product type to the worker; receiving, by the mobile device, product information associated with at least one product of the second product type from the worker via voice; and requesting, by the mobile device, a quantity of products of the second product type that are marked with the product information associated with the at least one product of the second product type.

The foregoing illustrative summary, as well as other exemplary objectives and/or advantages of the invention, and the manner in which the same are accomplished, are further explained within the following detailed description and its accompanying drawings.

DETAILED DESCRIPTION

The present disclosure is generally directed to an automated product management system, wherein in one embodiment the system is configured to assist a worker in handling dated products by engaging in a verbal dialog with the worker. In one example, the worker can engage products with both of his or her hands while simultaneously fully participating in the verbal dialog with the product management system, which can enhance the productivity of the worker. More generally and in one example, the present disclosure embraces a method of managing products by associated product information. As one example, the product information can be dates respectively associated with the products, as discussed in greater detail below.

In an embodiment of this disclosure, the product management system can include one or more mobile devices that can be in the form of headset assemblies. Each of the mobile devices, or headset assemblies, can comprise a wireless-enabled voice recognition device that is configured to be used in a hands-free manner. Alternatively, the mobile devices can be manually carried or mounted to a movable piece of equipment, such as a cart being used by a worker.

Figure 1:
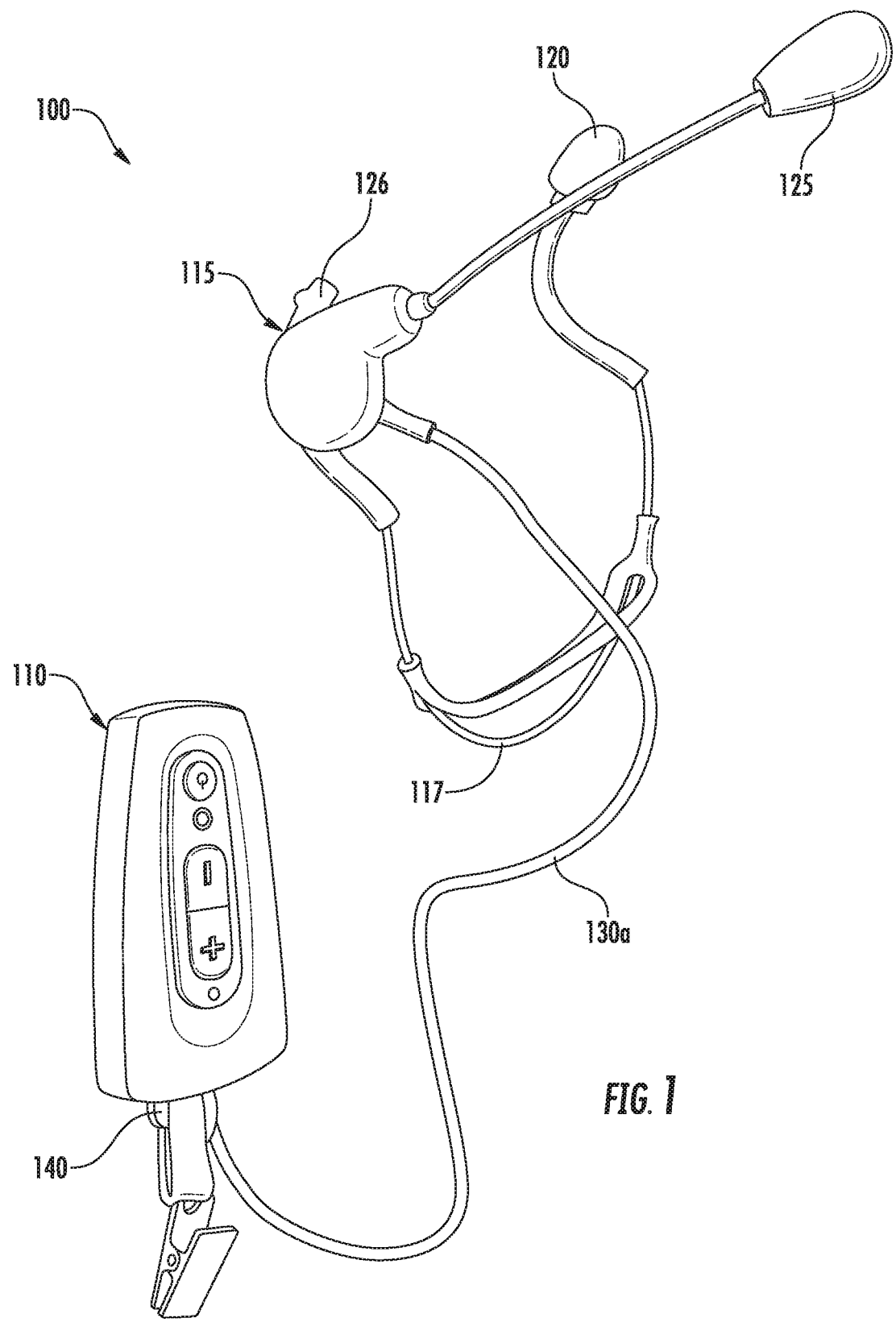
FIG. 1 is a perspective view of a representative headset assembly, in accordance with an embodiment of this disclosure.

In FIG. 1, an example of a mobile device in the form of a headset assembly 100 is shown as including an electronics module 110 and a headset 115. Whereas the mobile device described in this detailed description is frequently referred to as the headset assembly 100, a variety of different types of suitable mobile devices are within the scope of this disclosure, such as smartphones, smartwatches or other suitable devices.

In the embodiment shown in FIG. 1, the headset 115 includes a headband 117 for securing the headset to the worker's head. Alternatively, the headband 117 or other suitable fastening or mounting features can be configured to fit in an ear, over an ear, or otherwise be designed to support the headset 115. The headset 115 can further include at least one speaker 120, and one or more microphones 125, 126. For example, the main microphone 125 can be configured for being proximate to the worker's mouth, for converting voice sounds from the worker into an electrical signal. In contrast, the optional secondary microphone 126 can be configured for being distant from the worker's mouth, for use and receiving and cancelling out environmental sounds to enhance voice recognition associated with the main microphone 125.

The electronics module 110 can contain or otherwise carry several components of the headset assembly 100 to reduce the weight and/or size of the headset 115. In some embodiments, the electronics module 110 can include one or more of a rechargeable or long life battery, keypad, Bluetooth® antenna, printed circuit board assembly (PCBA), and any other suitable electronics, or the like. The electronics module 110 can be mounted to a worker's torso (e.g., via a lapel clip and/or lanyard) or in any other suitable location. The headset 115 can be connected to the electronics module 110 via a communication link, such as a small audio cable 130 or a wireless link. The headset 100 can be used to support multiple workflows in multiple markets, including grocery retail, direct store delivery, wholesale, etc. In some embodiments, the headset 100 has a low profile that seeks not to be intimidating to a customer in a retail setting. That is, the headset 115 can be relatively minimalistic in appearance in some embodiments, or alternatively the headset 115 can have a larger profile in other embodiments. The electronics module 110 can be used with a wide variety of differently configured headsets, such as Vocollect™ headsets.

The electronics module 110 can be configured to read a unique identifier (I.D.) of the headset 115. The headset I.D. can be stored in an electronic circuitry package that is part of the headset 115, and the headset electronic circuitry package can be configured to at least partially provide the connection (e.g., communication path(s)) between the electronics module 110 and headset features (e.g., the one or more speakers 120 and microphones 125, 126). In one embodiment, the audio cable 130 includes multiple conductors or communication lines for signals which can include a speaker +, speaker −, main microphone, secondary microphone, and grounds. The electronics module 110 can utilize a user-configurable attachment feature 140, such as a plastic loop and/or other suitable features, for at least partially facilitating attachment of the electronics module to the worker. When a wireless link between the headset 115 and electronics module 110 is used, such as a Bluetooth type of communication link, the headset 115 can include a small lightweight battery. The wireless communication link can provide wireless signals suitable for exchanging voice communications. In an embodiment (not shown), the electronics module 110 can be integrated into the headset 115 rather than being remote from, and connected to, the headset 115. Accordingly, the mobile device, which may more specifically be in the form of the headset assembly 100, or the like, may include multiple pieces with separate housings or can be substantially contained in, or otherwise be associated with, a single housing.

Figure 2:
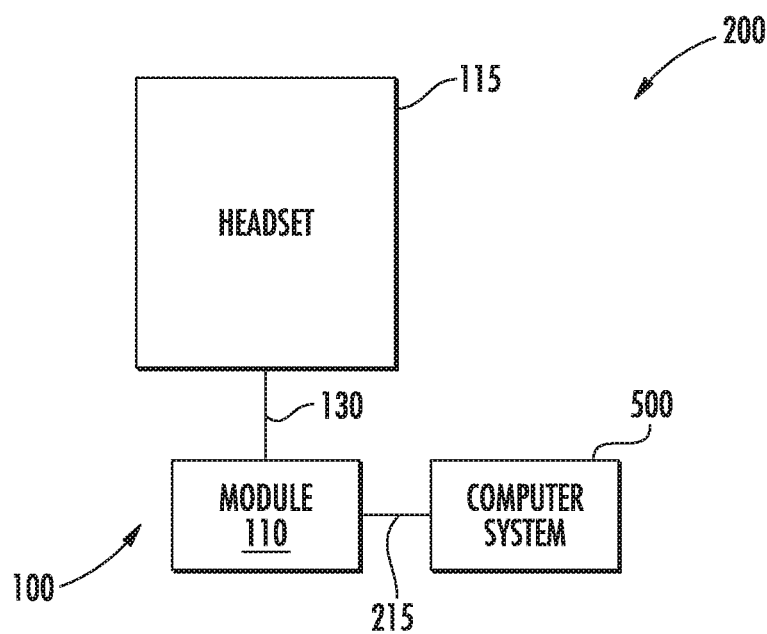
FIG. 2 is a diagram of a system that includes the headset assembly of FIG. 1, in accordance with an embodiment.

In the embodiment shown in FIG. 2, the headset assembly 100 is part of a distributed product management system 200, or the like, configured for providing communications with a worker. The worker can be wearing the headset 115 on her or his head so that the speaker 120 is proximate the worker's ear, and the microphone 125 is proximate to the worker's mouth. As shown in FIG. 2, the system 200 further includes a terminal, server computer 500, or the like, connected to the electronics module 110 via one or more communication paths 215 that can comprise a wireless line 215, such as a Bluetooth® connection. The computer 500 can be one or more computers, such as a series of computers connected to one another in wired and/or wireless manner over a network, such as WLAN, to form a distributed computer system. The computer 500 can comprise a retail store computer having applications and data for managing operations of the retail store (e.g., an enterprise system, such as a retail management system, inventory management system or the like), including inventory control and other functions, such as point of sale functions.

In an embodiment, the computer 500 is configured to simultaneously interface with multiple of the headset assemblies 100, and thereby the workers respectively associated with the headset assemblies, to simultaneously provide one or more work tasks or workflows that can be related to the products or other items handled by the workers in a workplace (e.g., a retail store). The computer 500 can be located at one facility (e.g., the retail store) or be distributed at geographically distinct facilities. Furthermore, the computer 500 may include a proxy server. Therefore, the computer 500 is not limited in scope to a specific configuration. For example, and alternatively, each of the headset assemblies 100 can substantially be a stand-alone device, such that the computer 500 or suitable features thereof are part of the headset assembly. Usually, however, to have sufficient database capability to simultaneously handle large amounts of information that can be associated with multiple headset assemblies 100 being operated simultaneously, the computer 500 typically comprises a server computer configured to simultaneously interface with multiple of the headset assemblies.

In an embodiment, voice templates can be stored in the computer 500 to recognize worker voice interactions and convert the interaction into text-based data and commands for interaction with at least one software application or module being executed on at least one processor or processing unit of the computer 500. The functions ascribed to individual elements of the system 200 can be performed in one or more other locations in further embodiments. For example, computer 500 can perform voice recognition in one embodiment, or the electronics module 110 can perform voice recognition utilizing the voice templates. In one embodiment, the first stages of voice recognition can be performed on the electronics module 110, with further stages performed on the computer 500. In further embodiments, raw audio can be transmitted from the electronics module 110 to the computer 500 where the final stages of voice recognition are completed.

Figure 3A:
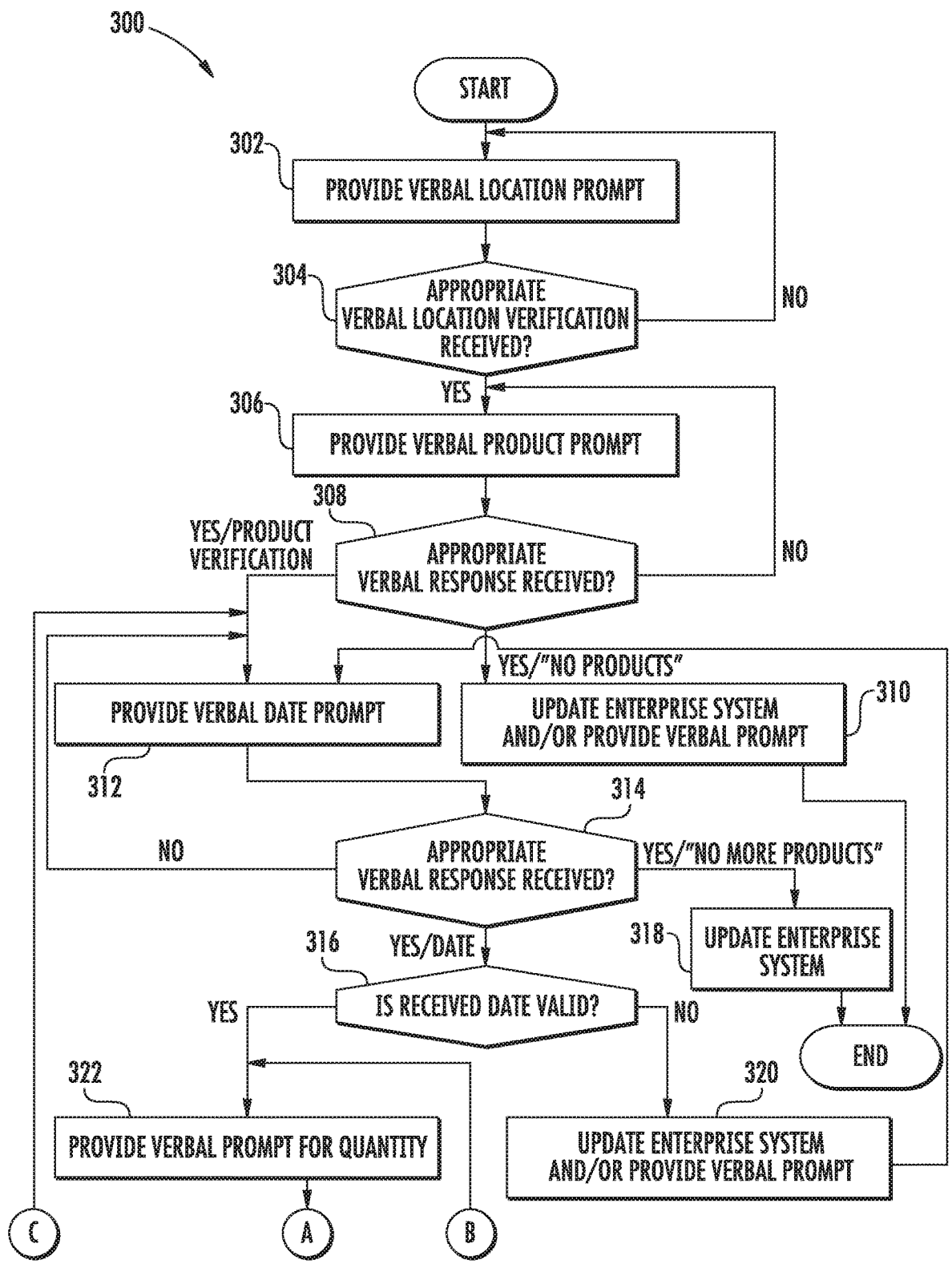
FIGS. 3A and 3B illustrate a flow diagram of a method performed by the system of FIG. 2 for managing products by associated product information (e.g., managing dates associated with products), in accordance with an embodiment.
Figure 3B:
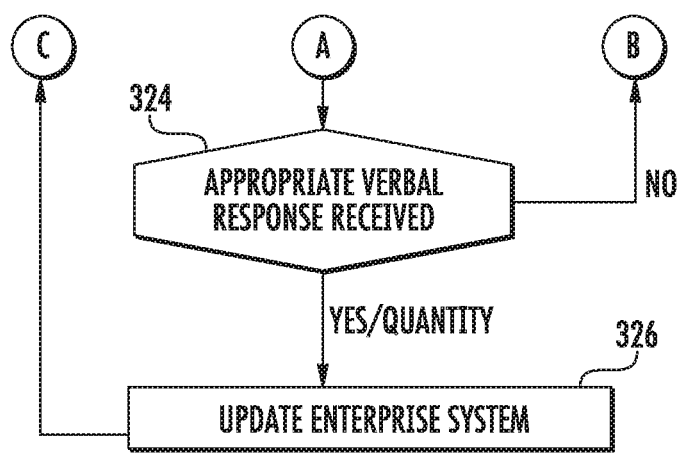

FIGS. 3A and 3B illustrate a flow or block diagram of a method 300 of operations performed by the system 200, such as in response to middleware being executed on the computer 500, in accordance with an embodiment. The method 300 is illustrative of how the system 200 can interact with a representative worker to facilitate management of products such as, but not limited to, dated products. Each block of the method 300 may be schematically indicative of at least one step and/or associated element(s) of the system 200. In the following, as an example and not for the purpose of limiting the scope of this disclosure, the method 300 is at times described in the context of a retail establishment containing different types of products ("product types") (e.g., bread, dairy products, vegetables, beverages, etc.), wherein the products can be in the form of packages that are each individually marked with product information that may comprise dates (e.g., products with freshness, expiration or sale-by dates, or the like). As another example, the dated products can be supported on retail store shelves or endcaps, contained in bins, or be in any other suitable conventional configuration, such as by being in warehouse or other suitable settings. For example and not for the purpose of limiting the scope of this disclosure, one of the product types can be verbally identified as "gallon cartons of a predetermined brand of whole milk," and there can be numerous products or cartons of that product type, with each of the cartons being marked with a sale-by date, and some of the cartons having different sale-by dates as compared to one another. Accordingly and as another example, a product type can be verbally identified by its brand name, size and sometimes also by one or more of a variety, type or style of the product (e.g., Green Giant® Asiago Parmesan Risotto Vegetables, 11 oz.) and/or by any other suitable, unique product identifier such as a Universal Product Code (UPC), a portion thereof, or the like.

In one embodiment, the method 300 can be performed (e.g. looped through) in serial fashion for each product type of a plurality of product types, wherein the products of the different product types can be in the form of packages that are each individually marked with, or otherwise associated with, dates, such as discussed above. As a precursor to, or an early part of, the method 300, the system 200 may serially identify product types to be subjected to the method 300. The system 200 may identify such a product type solely for the purposes of fulfilling the workflow of method 300 for the product type, or the product type can be identified for additional workflow purposes. For example, the method 300 can be performed substantially simultaneously with one or more other workflows for the subject product type, such as restocking, facing/blocking, price relabeling and/or any other suitable workflows, or the like.

In the method 300, the provision of each of the numerous verbal prompts (e.g., at blocks 302, 306, 310, 312, 320 and/or 322) can comprise the speaker 120 converting or transforming an audio signal, which is provided by respective features of the system 200, to a voice-sound for being received by the worker; and the receipt of each of the verbal responses (e.g., as a precursor to blocks 304, 308, 314 and/or 324) can comprise the microphone 125 converting or transforming a voice sound, which is provided by the worker, to an electrical signal that is provided to respective features of the system 200. The mobile device or headset assembly 100 can provide the verbal prompts substantially in response to, or at least partially in response to, receiving information from the computer 500. For example, the headset assembly 100 can provide the verbal prompts in real time/immediately in response to receiving information from the computer 500 and/or there may be a brief or any suitable time lag, or queuing, associated with the headset assembly 100 providing the verbal prompts. Alternatively, one or more of the verbal prompts and/or verbal responses can be replaced by or substituted with other responses, such as nonverbal (e.g., visual) prompts and/or nonverbal (e.g., typed and/or scanned) responses, or the like.

In one embodiment, the method 300 can optionally begin at block 302. At block 302, at least one verbal location prompt can be provided by the system 200 to the worker, and this verbal prompt can comprise information about a location at which a first product type of a plurality of product types is located. As an example, the verbal prompt of block 302 can include information about an aisle, shelf and/or any other suitable location at which the first product type is located. After the provision of the verbal prompt at block 302, processing control can be transferred to block 304. Associated with or as a precursor to block 304, the system 200 may receive a verbal response from the worker, and the verbal response can be a verbal location verification, or the like, comprising one or more of the words "ready," "okay," and/or any other suitable verbal response for indicating that the worker is proximate the location indicated at block 302 for the first product type. Block 304 can be configured to be operative so that, in response to the system 200 not receiving an appropriate verbal response to the verbal prompt of block 302, such as within a predetermined timeframe, processing control is returned to block 302. In response to the system 200 receiving an appropriate verbal response to the verbal prompt of block 302, such as within a predetermined timeframe, processing control can be transferred from block 304 to block 306.

Generally described, the system 200 can be configured so that for blocks 306 and/or 308, or the like, the system 200 is configured to participate in a verbal dialog with the worker so that, generally described, both the system 200 and the worker are directing their attention to the same product type. For example, in an alternative embodiment, the worker may originally identify the first product type and verbally or otherwise provide information for the first product type to the system 200, and in response the system 200 may provide some sort of confirmation regarding the first product type, such as by providing a verbal verification comprising identifying information for the first product type and/or one or more of the words "ready," "okay," and/or any other suitable response for indicating that both the system 200 and the worker are directing their attention to the same product type.

More specifically and in accordance with the embodiment shown in FIGS. 3A and 3B, at block 306 at least one verbal product prompt can be provided by the system 200 to the worker, and this verbal prompt can comprise a verbal identification of the first product type. Examples of suitable verbal identifications of product types are discussed above. After the provision of the verbal prompt at block 306, processing control can be transferred to block 308. Associated with or as a precursor to block 308, the system 200 may receive a verbal response from the worker. In response to the system 200 receiving an appropriate verbal response to the verbal prompt of block 306, such as within a predetermined timeframe, processing control can be transferred from block 308 to a respective one of blocks 310 and 312.

At least partially reiterating from above, an appropriate verbal response associated with block 308 can be a verbal response from the worker indicating that the worker has at least identified the location where the first product type is supposed to be located. For example, an appropriate verbal response from the worker for block 308 can be that there are no products of the first product type present in the location identified at block 302. In that case, processing control can be transferred from block 308 to block 310. At block 310, an enterprise or other suitable system associated with the computer 500 can be notified about the lack of products of the first product type, the system 200 can verbally prompt the worker to restock the first product type or take other corrective action, and/or the method 300 may end for the first product type.

As another example and at least partially reiterating from above, an appropriate verbal response associated with block 308 can be a verbal response from the worker comprising one or more of the words "ready," "okay," and/or any other suitable verbal verification for indicating that the worker has identified one or more products of the first product type at the location identified at block 302. For example, associated with or as a precursor to block 308, the system 200 may receive a verbal response from the worker, and the verbal response can be in the form of a confirmation comprising verbal identification of the first product type. As discussed above, examples of suitable verbal identifications of product types can include brand name, size, variety and/or other suitable product identifiers such as a Universal Product Code (UPC), a portion thereof, or the like. Block 308 can be configured to be operative so that, in response to the system 200 not receiving an appropriate verbal response to the verbal prompt of block 308, such as within a predetermined timeframe, processing control is transferred back to block 304. In response to the system 200 receiving an appropriate verbal response to the verbal prompt of block 308, such as within a predetermined timeframe, processing control can be transferred from block 308 to block 312.

At block 312, at least one verbal date prompt can be provided by the system 200 to the worker, and this verbal prompt can comprise a request for a date (e.g., freshness, expiration or sale-by date, or the like) associated with (e.g., printed, stamped or attached to the packaging of) at least one product of the first product type. After the provision of the verbal prompt at block 312, processing control can be transferred to block 314. Associated with or as a precursor to block 314, the system 200 may receive a verbal response from the worker. Block 314 can be configured to be operative so that, in response to the system 200 not receiving an appropriate verbal response to the verbal prompt of block 312, such as within a predetermined timeframe, processing control is transferred back to block 312. In response to the system 200 receiving an appropriate verbal response to the verbal prompt of block 312, such as within a predetermined timeframe, processing control can be transferred from block 314 to a respective one of blocks 316 and 318.

An appropriate verbal response associated with block 314 can be a verbal response from the worker that is indicative of a date associated with a first product of the first product type. In response to such a response, processing control can be transferred from block 314 to block 316. At block 316, the system 200 may determine whether the date received in association with block 314 is valid. As an example, a date verbally received from a worker in association with block 316 can be valid if that date is not later than the present day (e.g., a verbally received date can be valid if it is the present calendar day or a future calendar day).

In response to a negative determination being made at block 316, processing control can be transferred to block 320. At block 320, an enterprise system, or the like, associated with the computer 500 can be notified that there are outdated products of the first product type and/or the system 200 can verbally prompt the worker to remove the outdated products of the first product type from their location so that they are no longer available for sale, or the like. Processing control can be transferred from block 320 back to block 312. Alternatively, the step or process of block 320 can follow the step or process of block 322, or other suitable provisions can be made, so that the enterprise system, or the like, associated with the computer 500 can be notified of the quantity of outdated products of the first product type.

In response to a positive determination being made at block 316, processing control can be transferred to block 322. At block 322, at least one verbal quantity prompt can be provided by the system 200 to the worker, and this verbal prompt can comprise a request for a quantity of the products of the first type that are marked with the date most recently received by the system 200 in association with block 314. Processing control can be transferred from block 322 to block 324. Associated with or as a precursor to block 324, the system 200 may receive a verbal response from the worker. Block 324 can be configured to be operative so that, in response to the system 200 not receiving an appropriate verbal response to the verbal prompt of block 322, such as within a predetermined timeframe, processing control is returned to box 322.

An appropriate verbal response associated with block 324 can be a verbal response from the worker that is indicative of product information. At block 324, the verbal response from the worker, which is indicative of product information, can be a quantity (e.g., "one," "two," "three" or another suitable whole number) of the first type of products that are marked with the date most recently received by the system 200 in association with block 314. In response to the system 200 receiving such a verbal response, processing control can be transferred to block 326. At block 326, an enterprise system, or the like, associated with the computer 500 can be notified of the quantity of the first type of products that are marked with the date most recently received by the system 200 in association with block 314.

Processing control can be transferred from block 326 to block 312. At the second occurrence of block 312, at least one verbal date prompt can be provided by the system 200 to the worker, and this verbal prompt can comprise a request for another date associated with at least one product of the first product type. The system 200 can be configured and/or workers may be trained so that at the second and subsequent occurrences of block 312 for a product type, dates already processed by the system 200 for the product type are not repeated.

The loop comprising blocks 312, 314, 316, 322, 324 and 326 can be repeated for each differently dated group of products of the first product type until processing control is transferred to block 318. For example, in response to the system 200 receiving a verbal response that is from the worker and is associated with block 314, and the verbal response being indicative of there being no more products of the first type for which dates have not been provided in association with block 314, processing control is transferred to block 318. At block 318, an enterprise system, or the like, associated with the computer 500 can be notified, for example, that the method 300 has been completed for the first type of products, and the method 300 may end for the first product type.

The system 200 can be configured so that after the method 300 has been completed for the first type of products, the method is automatically completed in series for other products of the plurality of dated products, such as a second type of products, and then a third type of products, and so on. The method 300 can be described as being schematically illustrative of one or more software modules that may be executed on the computer 500 and/or headset assembly 100, and such one or more modules may be referred to as a date capture module, or the like. As another example, block 316 can be described as being schematically illustrative of one or more software modules that may be executed on the computer 500 and/or headset assembly 100, and such one or more modules may be referred to as a validity module, or the like. Similarly, one or more other blocks of the method 300 may be characterized as being schematically illustrative of one or more other software modules for being executed on the computer 500 and/or headset assembly 100, or the like. One or more steps or blocks of the method 300 can be omitted or rearranged in a suitable manner, and suitable additional blocks or steps may be incorporated into the method 300.

In accordance with one aspect of this disclosure, the method 300 can schematically represent middleware that accepts a list of products that need to have their expiration date, or some other suitable date, verified etc. The list can be a product master list, a separate list, or the like. In one embodiment, the method 300 can schematically represent a date capture workflow that can be interleaved into (e.g., performed substantially simultaneously with) various other workflows, including stocking, so that a worker may not travel through the retail store for the sole purpose of verifying or otherwise managing the product dates. The workflow associated with the method 300 can prompt (e.g., verbally) the user with a location to go to and a product to verify, and can wait for the worker's confirmation (e.g., verbal confirmation) that they are handling the correct product, and upon such product verification the worker can be prompted (verbally) for an associated date. Upon valid (e.g., verbal) date entry the worker can be prompted (e.g., verbally) for the quantity of products matching the entered date. A valid date can be any date that is the present day's date or any future date. Upon quantity entry, the workflow returns to prompt (e.g., verbally) again for a date until the worker says "no more," or the like, and the workflow moves to the next item or product requiring date capture, or the like. All information captured can be sent to and stored in the middleware for processing, such as for integration with point of sale data, alert triggering and/or other suitable actions.

Figure 4:
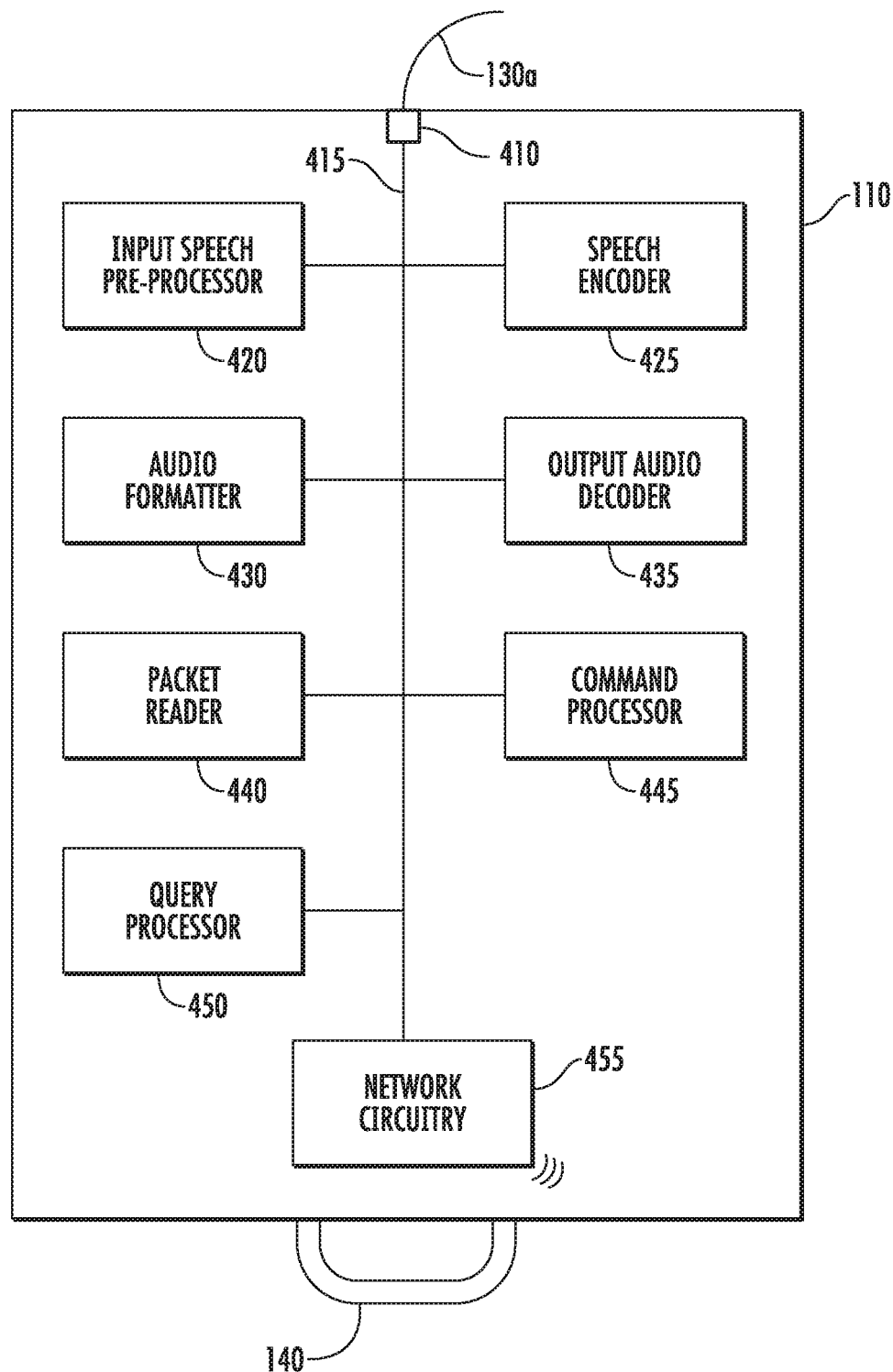
FIG. 4 is a diagram of an electronics module of the headset assembly of FIG. 1, in accordance with an embodiment.

In an embodiment shown in FIG. 4, the electronics module 110 includes an enclosure, such as plastic case, with a connector 410 that mates with a complimentary mating connector (not shown) on audio cable 130. An internal path 415 or buss can be used to communicate between multiple components within the electronics module 110. In one embodiment, an input speech pre-processor (ISPP) 420 converts input speech into pre-processed speech feature data. An input speech encoder (ISENC) 425 encodes input speech for transmission to a remote terminal for reconstruction and playback and/or recording. A raw input audio sample packet formatter 430 transmits the raw input audio to a remote terminal, such as computer system 500, using an application-layer protocol to facilitate communications between the computer system and headset 115 as the transport mechanism. For the purposes of the transport mechanism, the formatter 430 can be abstracted to a codec type referred to as Input Audio Sample Data (IASD). An output audio decoder (OADEC) 435 decodes encoded output speech and audio for playback in the headset 115. A raw output audio sample packet reader 440 operates to receive raw audio packets from the remote terminal using the transport mechanism. For the purposes of the transport mechanism, this formatter 430 can be abstracted to a codec type referred to as Output Audio Sample Data (OASD). A command processor 445 adjusts the headset 115 hardware (e.g., input hardware gain level) under control of a remote computer or terminal 500. A query processor 450 allows the computer 500 to retrieve information regarding headset operational status and configuration. Path 415 is also coupled to network circuitry 455 to communicate via wired or wireless protocol with the computer or terminal 500. The ISPP 420, ISENC 425, and raw input audio formatter 430 are sources of communication packets used in the transport mechanism; the OADEC 435 and raw output audio reader 440 are packet sinks. The command and query processors 445,450 are both packet sinks as well as sources (in general they generate acknowledgement or response packets).

Figure 5:
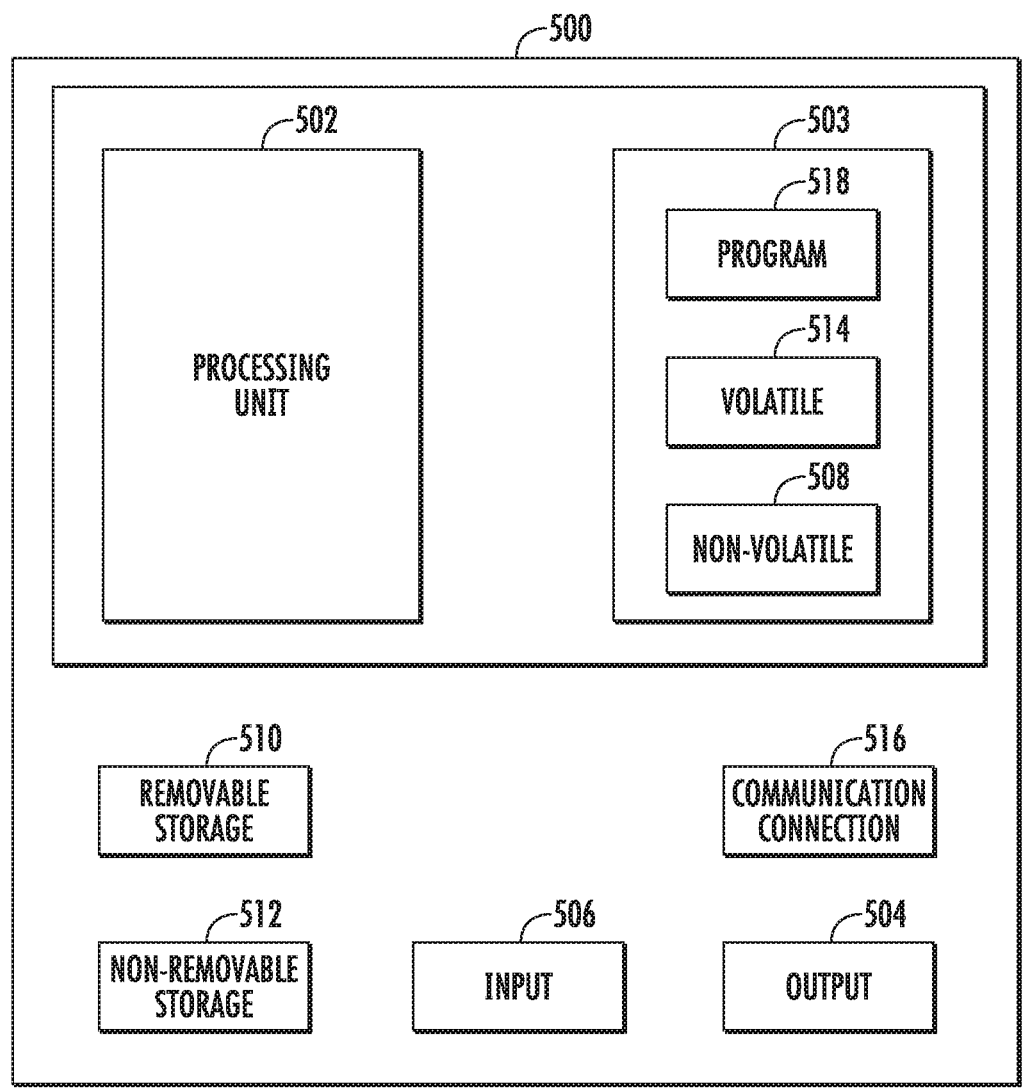
FIG. 5 is a diagram of a computer of the system of FIG. 2, in accordance with an embodiment.

In an embodiment shown in FIG. 5, the computer system 500 implements components and methods of the distributed headset 100. Each of the following components may be used in various combinations, in various embodiments. For example, the computer system 500, can include one or more of a processor processing unit 502, memory 503, removable storage 510, and non-removable storage 512. Although the example computing device is illustrated and described as computer system 500, the computing device can be in different forms in different embodiments. For example, the computing device can also be a laptop, desktop, server, smartphone, a tablet, headset, smartwatch, or other computing device including the same or similar elements as illustrated and described with regard to FIG. 5. Devices such as smartphones, tablets, headsets, and smartwatches are generally collectively referred to as mobile devices. Further, although the various data storage elements are illustrated as part of the computer 500, the storage can also or alternatively include cloud-based storage accessible via a network, such as the Internet.

Memory 503 can include volatile memory 514 and non-volatile memory 508. Computer 500 can include, or have access to a computing environment that includes, a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 500 can include or have access to a computing environment that includes input 506, output 504, and at least one communication device or connection 516 (e.g., a transceiver, or the like, for providing a communication connection (e.g., at least partially providing the wireless line 215 (FIG. 2))). Output 504 can include a display device, such as a touchscreen, that also can serve as an input device. The input 506 can include one or more of a touchscreen, touchpad, mouse, keyboard, camera, one or more device-specific buttons, one or more sensors integrated within or coupled via wired or wireless data connections to the computer 500, and other input devices. The computer 500 can operate in a networked environment using a communication connection to connect to one or more remote computers, such as database servers. The remote computer 500 can include a personal computer (PC), server, router, network PC, a peer device or other common network node, or the like. The communication connection can include a Local Area Network (LAN), a Wide Area Network (WAN), cellular, WiFi, Bluetooth, or other networks.

Computer-readable instructions stored on a computer-readable medium are executable by the processing unit 502 of the computer 500. A hard drive, CD-ROM, and RAM are some examples of articles including a non-transitory computer-readable medium such as a storage device. The terms computer-readable medium and storage device do not include carrier waves. For example, a computer program 518 capable of providing a generic technique to perform access control check for data access and/or for doing an operation on one of the servers in a component object model (COM) based system can be included on a CD-ROM and loaded from the CD-ROM to a hard drive. The computer-readable instructions allow computer 500 to provide generic access controls in a COM based computer network system having multiple users and servers.

An aspect of this disclosure is the provision of numerous examples that can be configured in a variety of combinations and subcombinations. In a first example, a method of managing products, such as by associated dates, comprises a mobile device identifying a product type to a worker; the mobile device receiving from the worker, via voice, a date associated with at least one product of the product type; and the mobile device providing to the computer information indicative of the date associated with the at least one product.

A second example comprises the first example, wherein the mobile device comprises a headset.

A third example comprises the first example, wherein the mobile device identifies the product type to the worker via voice.

A fourth example comprises the first example and the computer determining whether the date associated with the at least one product is valid.

A fifth example comprises the first example and the mobile device requesting, via voice, a quantity of products of the product type that are marked with the date associated with the at least one product.

A sixth example comprises a system for managing products by associated dates, the system comprising: a mobile device configured to receive information from a worker via voice, and provide information to the worker via voice; and a computer configured to communicate at least indirectly with the mobile device, the computer including a date capture module configured to facilitate collection of dates associated with product types, wherein for each product type the date capture module is configured to: cause the mobile device to verbally communicate with the worker regarding the product type, and receive, from the mobile device, information indicative of a date associated with at least one product of the product type.

A seventh example comprises the sixth example, wherein the mobile device comprises a headset.

An eighth example comprises the sixth example, wherein the computer further comprises a validity module that is configured to determine whether the date associated with the at least one product is valid.

A ninth example comprises the sixth example, wherein: the date capture module is configured to cause the mobile device to provide at least one voice prompt to the worker; and the at least one voice prompt comprises information regarding the product type.

A tenth example comprises the ninth example, wherein the at least one voice prompt comprises a request for the date associated with the at least one product.

An eleventh example comprises the ninth example, wherein: the at least one voice prompt comprises a first voice prompt; and the date capture module is configured to: cause the mobile device to provide a second voice prompt requesting a quantity of products of the product type that are marked with the date associated with the at least one product, and receive, from the mobile device, information indicative of the quantity of products of the product type that are marked with the date associated with the at least one product.

A twelfth example comprises a computer for managing products by associated dates, the computer comprising: a communication device configured to communicate at least indirectly with a mobile device; a processor; and a date capture module configured to the executed by the processor to facilitate collection of dates associated with product types, wherein for each product type the date capture module is configured to: cause the mobile device to verbally communicate with a worker regarding the product type, and receive, from the mobile device, information indicative of a date associated with at least one product of the product type.

A thirteenth example comprises the twelfth example, wherein the date capture module is configured to cause the mobile device to provide information regarding the product type to the worker via voice.

A fourteenth example comprises the twelfth example, wherein the computer further comprises a validity module configured to be executed by the processor to determine whether the date associated with the at least one product is valid.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;

U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;

U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of managing products by associated product information, the method comprising:

transforming, by a mobile device, a first electrical signal corresponding to a first voice prompt to a worker into a first sound signal to identify a product type to the worker;

transforming, by the mobile device, a second sound signal, received from the worker in response to the first sound signal, into a second electrical signal indicative of a confirmation of the product type;

transforming, by the mobile device, a third sound signal into a third electrical signal, wherein the third sound signal, received from the worker in response to the confirmation of the product type, is indicative of product information associated with at least one product of the confirmed product type;

providing, by the mobile device, information indicative of a date associated with the at least one product, to a computer;

determining, by the computer, the date associated with the at least one product of the confirmed product type is valid based on determining that the date is equal to or later than a current date;

in response to determining that the date associated with the at least one product of the confirmed product type is valid, transforming, by the mobile device, a fourth electrical signal corresponding to a second voice prompt to the worker into a fourth sound signal to request a quantity of products of the product type that are marked with the validated date; and in response to determining that the date associated with the at least one product of the confirmed product type is invalid based on determining that the date is earlier than the current date, generating a notification indicating that the at least one product of the confirmed product type is expired.

2. The method of claim 1, wherein the mobile device comprises a headset.

3. The method of claim 1, wherein the product information is the date associated with the at least one product.

4. The method of claim 3, wherein the date is a first date, and the method further comprises:

transforming, by the mobile device, a fifth electrical signal corresponding to a third voice prompt to the worker into a fifth sound signal to request a second date associated with at least one product of the product type;

transforming, by the mobile device, a sixth sound signal indicative of the second date into a sixth electrical signal;

transforming, by the mobile device in response to the mobile device receiving the second date, a seventh electrical signal corresponding to a fourth voice prompt to the worker into a seventh sound signal to request a quantity of products of the product type that are marked with the second date; and transforming, by the mobile device, an eighth sound signal indicative of the quantity into an eighth electrical signal.

5. The method of claim 1, further comprising transforming, by the mobile device, the fourth electrical signal corresponding to the second voice prompt to the worker into the fourth sound signal to request the quantity of products of the product type that are marked with the product information.

6. The method of claim 5, wherein the product type is a first product type, and the method further comprises:

transforming, by the mobile device, a fifth electrical signal corresponding to a third voice prompt to the worker into a fifth sound signal to identify a second product type to the worker;

transforming, by the mobile device, a sixth sound signal into a sixth electrical signal indicative of product information associated with at least one product of the second product type; and transforming, by the mobile device, a seventh electrical signal corresponding to a fourth voice prompt to the worker into a seventh sound signal to request a quantity of products of the second product type that are marked with the product information associated with the at least one product of the second product type.

7. A system for managing products by associated product information, the system comprising:

a mobile device comprising a first processor configured to:

transform a first electrical signal corresponding to a first voice prompt to a worker into a first sound signal to identify a product type to the worker;

transform a second sound signal, received from the worker in response to the first sound signal, into a second electrical signal indicative of a confirmation of the product type;

transform a third sound signal into a third electrical signal, wherein the third sound signal, received from the worker in response to the confirmation of the product type, is indicative of product information associated with at least one product of the confirmed product type;

provide information indicative of a date associated with the at least one product of the confirmed product type, to a computer;

the computer comprising a second processor is configured to:

determine that the date associated with the at least one product of the confirmed product type is valid based on determining that the date is equal to or later than a current date; and wherein the first processor is further configured to:

in response to the determination that the date associated with the at least one product of the confirmed product type is valid, transform, a fourth electrical signal corresponding to a second voice prompt to the worker into a fourth sound signal to request a quantity of products of the product type that are marked with the validated date; and wherein the second processor is further configured to:

in response to the determination that the date associated with the at least one product of the confirmed product type is invalid based on determining that the date is earlier than the current date, generate a notification indicating that the at least one product of the confirmed product type is expired.

8. The system of claim 7, wherein the mobile device further comprises a headset.

9. The system of claim 7, wherein the product information is the date associated with the at least one product.

10. The system of claim 9, wherein the date is a first date, and the first processor is further configured to:

transform a fifth electrical signal corresponding to a third voice prompt to the worker into a fifth sound signal to request a second date associated with at least one product of the product type;

transform a sixth sound signal indicative of the second date into a sixth electrical signal;

transform, in response to the reception of the second date, a seventh electrical signal corresponding to a fourth voice prompt to the worker into a seventh sound signal to request a quantity of products of the product type that are marked with the second date; and transform an eighth sound signal indicative of the quantity into an eighth electrical signal.

11. The system of claim 7, wherein the first processor is further configured to transform the fourth electrical signal corresponding to the second voice prompt to the worker into the fourth sound signal to request the quantity of products of the product type that are marked with the product information.

12. The system of claim 11, wherein the product type is a first product type, and wherein the first processor is further configured to:

transform a fifth electrical signal corresponding to a third voice prompt to the worker into a fifth sound signal to identify a second product type to the worker;

transform a sixth sound signal into a sixth electrical signal indicative of product information associated with at least one product of the second product type; and transform a seventh electrical signal corresponding to a fourth voice prompt to the worker into a seventh sound signal to request a quantity of products of the second product type that are marked with the product information associated with the at least one product of the second product type.

\* \* \* \* \*